A. C. Judson,
Hoe.

№ 107,060.          Patented Sep. 6, 1870.

Witnesses:
Chas Jacobs
J. V. White

Inventor:
A. C. Judson.
Per
T. H. Alexander
Atty.

United States Patent Office.

ALONZO C. JUDSON, OF GRAND RAPIDS, OHIO.

Letters Patent No. 107,060, dated September 6, 1870.

IMPROVEMENT IN GARDEN-HOE.

The Schedule referred to in these Letters Patent and making part of the same.

*To all whom it may concern:*

Be it known that I, ALONZO C. JUDSON, of Grand Rapids, in the county of Wood and State of Ohio, have invented a certain new and useful Garden Implement; and I do hereby declare that the following is a full, clear, and exact description thereof, reference being had to the accompanying drawings, and to the letters of reference marked thereon, which form a part of this specification.

The nature of my invention consists in the construction and arrangement of a "garden implement," for the purpose of picking and pulling weeds, as will be hereinafter fully set forth.

In order to enable others skilled in the art to which my invention appertains to make and use the same, I will now proceed to describe its construction and operation, referring to the annexed drawings, in which—

Figure 1:
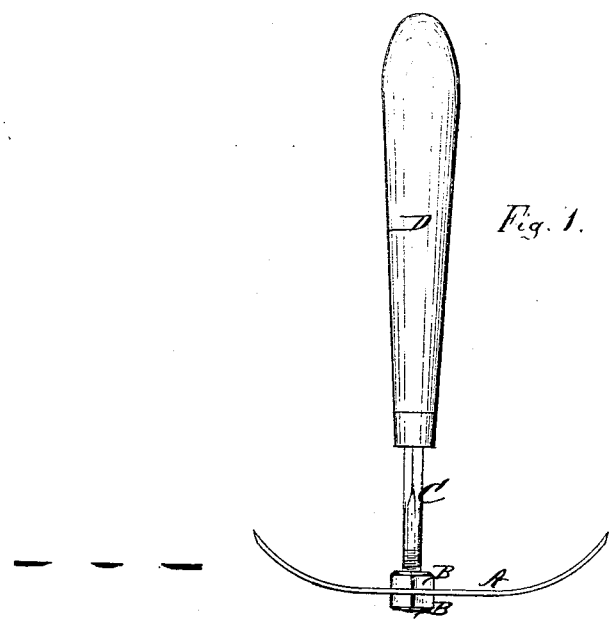
Figure 2:
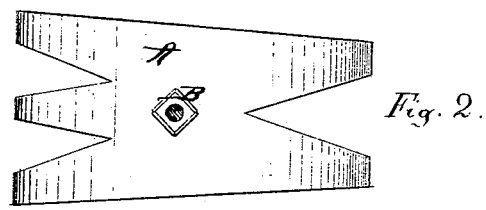

Figure 1 is a side view, and
Figure 2, an end view of my garden implement.

A represents a piece of steel cut with notches in the ends, and in the shape shown in fig. 2.

The notches are beveled from the back or lower side, to form edges on the front or upper side, and then the ends of the steel piece A are bent forward or hooking, as shown in fig. 1.

The plate A is secured between two nuts, B B, on a screw-rod or shank, C, which is firmly secured to the handle D.

By this means the plate A can be readily removed and put on a longer or shorter handle, as may be required.

The mode of using this instrument for picking or pulling weeds from garden-beds, &c., is readily seen. By pulling on the handle it will draw into the ground and straddle the roots of the weeds, then a slight pull takes them out, both root and branch.

I do not confine myself to any particular size of the notched plate, nor to any number or size of the notches in said plate, as they may be varied according to circumstances.

I am fully aware of hoes having been constructed with one forked end, and therefore do not wish to expand my claim to embrace any such invention; but

What I claim as new, and desire to secure by Letters Patent, is—

As a new article of manufacture, the plate A, notched at both ends, substantially as and for the purpose described.

In testimony that I claim the foregoing as my own, I affix my signature in presence of two witnesses.

A. C. JUDSON.

Witnesses:
ISRAEL POWELL,
B. M. CAMPBELL.